US010871288B2

(12) United States Patent
Park et al.

(10) Patent No.: US 10,871,288 B2
(45) Date of Patent: Dec. 22, 2020

(54) SEALED PLASMA MELTING FURNACE FOR TREATING LOW- AND INTERMEDIATE-LEVEL RADIOACTIVE WASTE

(71) Applicants: TRIPL CO. LTD., Daejeon (KR); UNITEST INC., Gyeonggi-do (KR)

(72) Inventors: Jong Kill Park, Daejeon (KR); Byung Soo Yoo, Sejong (KR); Seong Ki No, Daejeon (KR); Eun Ji Shin, Daejeon (KR); Hwan No Lee, Daejeon (KR); Jae Suk Huh, Gyeonggi-do (KR); Byung Woo Lee, Gyeonggi-do (KR)

(73) Assignees: Tripl Co., Ltd., Daejeon (KR); Unitest Inc., Gyeonggi-do (KR)

( * ) Notice: Subject to any disclaimer, the term of this patent is extended or adjusted under 35 U.S.C. 154(b) by 159 days.

(21) Appl. No.: 16/321,350

(22) PCT Filed: Jun. 9, 2017

(86) PCT No.: PCT/KR2017/006006
§ 371 (c)(1),
(2) Date: Jan. 28, 2019

(87) PCT Pub. No.: WO2018/021682
PCT Pub. Date: Feb. 1, 2018

(65) Prior Publication Data
US 2019/0162406 A1 May 30, 2019

(30) Foreign Application Priority Data
Jul. 28, 2016 (KR) ........................ 10-2016-0095844

(51) Int. Cl.
*B09B 3/00* (2006.01)
*F23G 5/027* (2006.01)
(Continued)

(52) U.S. Cl.
CPC ........... *F23G 5/0276* (2013.01); *F23G 5/008* (2013.01); *F23G 5/085* (2013.01); *F23G 5/16* (2013.01);
(Continued)

(58) Field of Classification Search
CPC ........ C10J 2300/0973; C10J 2300/0916; C10J 2300/093; C10J 2300/0946;
(Continued)

(56) References Cited

FOREIGN PATENT DOCUMENTS

| | | |
|---|---|---|
| JP | 2013101088 A | 5/2013 |
| KR | 20090044875 A | 5/2009 |

(Continued)

OTHER PUBLICATIONS

International Search Report issued by ISA/KR in connection with PCT/KR2017/006006 dated Sep. 19, 2017.

*Primary Examiner* — Jason Lau
(74) *Attorney, Agent, or Firm* — Levenfeld Pearlstein, LLC

(57) ABSTRACT

The present invention relates to a sealed plasma melting furnace for treating low- and intermediate-level radioactive waste, which allows the secondary pollutants to be minimized. The sealed plasma melting furnace includes: a waste supply chamber communicatively provided with a hopper; a pyrolysis chamber channel communicatively coupled with the waste supply chamber; a pyrolysis chamber having a burner mounted thereon; a melting chamber channel guiding the waste transferred from the pyrolysis chamber communicatively provided therewith to fall down; a melting chamber provided with a furnace interior portion accommodating a molten substance on a bottom surface thereof; a processed molten substance discharge channel discharging the processed molten substance generated in the melting chamber; a secondary combustion chamber channel inducing and
(Continued)

exhausting an off-gas flow generated in the melting chamber; and a secondary combustion chamber inducing complete combustion of the off-gas input from the secondary combustion chamber channel.

15 Claims, 4 Drawing Sheets

(51) Int. Cl.

| | |
|---|---|
| ***F27B 17/00*** | (2006.01) |
| ***G21F 9/30*** | (2006.01) |
| ***F23G 5/16*** | (2006.01) |
| ***F23G 5/08*** | (2006.01) |
| ***F23G 5/44*** | (2006.01) |
| ***F23G 5/00*** | (2006.01) |
| ***G21F 9/14*** | (2006.01) |
| ***G21F 9/32*** | (2006.01) |
| *F27D 99/00* | (2010.01) |

(52) U.S. Cl.
CPC ............. *F23G 5/444* (2013.01); *F23G 5/448* (2013.01); *F27B 17/00* (2013.01); *G21F 9/14* (2013.01); *G21F 9/30* (2013.01); *G21F 9/32* (2013.01); *F23G 2201/303* (2013.01); *F23G 2202/104* (2013.01); *F23G 2204/201* (2013.01); *F23G 2205/101* (2013.01); *F23G 2205/14* (2013.01); *F23G 2209/18* (2013.01); *F27D 99/0001* (2013.01); *F27D 2099/0031* (2013.01)

(58) Field of Classification Search
CPC ........ C10J 2300/1634; C10J 2300/0956; C10J 2300/165; C10J 2200/09; C10J 2300/094; C10J 2300/1606; C10J 2300/1675; C10J 2300/1687; C10J 2300/1869; C10J 2300/1884; C10J 3/42; C10J 3/721; C10J 3/723; C10J 3/82; C10J 2300/0989; C10J 2300/1659; C10J 3/32; C10J 3/34; C10J 3/482; C10J 3/523; C10J 2200/156; C10J 2300/0903; C10J 2300/0969; C10J 2300/1253; C10J 2300/1807; C10J 3/00; C10J 3/08; C10J 3/14; C10J 3/20; C10J 3/48; C10J 3/485; C10J 3/64; C10J 3/66; C10J 3/726; C10J 2300/0959; C10J 2300/1238; C10J 3/466; C10J 3/86; F23G 5/50; F23G 2201/301; F23G 2201/40; F23G 2202/102; F23G 2202/103; F23G 2202/104; F23G 2203/8013; F23G 2203/803; F23G 2203/805; F23G 2204/103; F23G 2900/54402; F23G 5/027; F23G 5/32; F23G 7/061; F23G 5/006; F23G 5/16; F23G 5/085; F23G 2204/201; F23G 5/0276; F23G 5/033; F23G 5/46; F23G 2202/20; F23G 2206/203; F23G 2209/262; F23G 7/003; F23G 2201/304; F23G 2203/403; F23G 2207/30; F23G 2207/60; F23G 2209/281; F23G 5/04; F23G 7/10; F23G 7/12; F23G 2201/701; F23G 2202/60; F23G 2203/30; F23G 2205/121; F23G 2206/10; F23G 2207/101; F23G 2207/112; F23G 2209/20; F23G 2900/50204; F23G 5/12; F23G 5/165
See application file for complete search history.

(56) References Cited

FOREIGN PATENT DOCUMENTS

| | | | |
|---|---|---|---|
| KR | 101172659 | B1 | 8/2012 |
| KR | 1020120128752 | A | 11/2012 |
| KR | 1020120129418 | A | 11/2012 |
| KR | 1020130055390 | A | 5/2013 |
| KR | 101274621 | B1 | 6/2013 |

SEALED PLASMA MELTING FURNACE FOR TREATING LOW- AND INTERMEDIATE-LEVEL RADIOACTIVE WASTE

This is a National Stage Application of International Patent Application No. PCT/KR2017/006006, filed Jun. 9, 2017, which claims the benefit of and priority to Korean Application No. 10-2016-0095844, filed Jul. 28, 2016, the entirety of which are incorporated fully herein by reference.

TECHNICAL FIELD

The present invention relates generally to a sealed plasma melting furnace for treating low- and intermediate-level radioactive waste and, more particularly, to a sealed plasma melting furnace for treating low- and intermediate radioactive waste, the furnace being able to safely treat a large amount of low- and intermediate radioactive waste generated in a nuclear power plant regardless of the physicochemical properties thereof.

BACKGROUND ART

Most of the radioactive waste generated in nuclear power plants is low-level waste, and in solid low-level radioactive waste, there are solidified waste of low-level liquid waste and dry active waste such as metal and heat insulation material generated by operation or periodic inspection of the power plants.

The dry active waste generated in the radiation controlled area is treated by being classified into combustible dry active waste such as cotton, paper, vinyl, rubber, plastic, or wood, and non-combustible dry active waste such as iron, glass, filter, soil, concrete, or wires.

The amount of generation of the dry active waste is somewhat different according to the operation condition of the power plant but occupies, however, 40 to 50% of the total amount of generation of the waste. In addition, the amount of the non-combustible dry active waste usually occupies 15 to 20% of the generated dry active waste.

There are various and complicated types of the dry active waste, some of which have a high melting point. Such dry active waste is difficult to precisely differentiate because of the fact that the waste often contains metals or non-combustible material such as gas filters or cans, various types of combustible and fire-retardant material, or metal parts including sheets and the like, which are often contained in a drum.

There are various methods such as cement solidification method, asphalt solidification method, compression method, incineration method, etc. in the treatment of solid waste generated in nuclear power plants. However, types of the low- and intermediate-level radioactive waste are various, and cesium (Cs) and cobalt (Co), which are radioactive materials, are contained also in the waste, therefore, the best treatment method of the same to process stably may be a melting method.

For the melting process, a large amount of energy is required for drying, pyrolysis, and combustion of the organic matter and for melting of the inorganic matter. For this purpose, a plasma torch equipped on the facility is used to generate ultra-high plasma heat, whereby the large amount of waste can be safely treated regardless of the physicochemical properties thereof.

Since the dry active waste having the largest amount of generation among the waste contains a large amount of organic matter, various kinds of off-gas ingredients are generated during the process thereof. Accordingly, it is necessary to secure the safety of the off-gas treatment process because of such radioactive materials.

Furthermore, incineration and melting facilities for the treatment of hazardous waste are provided with the drying device, the pyrolysis chamber, the melting chamber, and the secondary combustion chamber that are separately installed, whereby a wide installation area is required and a heat loss occurs because of heating for each facility. In addition, there is a potential that a dangerous situation such as exposure or scattering of radioactive material may occur because of a large number of incidental equipment attached to the facilities. Therefore, development of a device improved to secure the safety is required.

Documents of Related Art (Patent Document) Official Gazette of Korean Patent No. KR 10-1172659 (Publication Date: Aug. 8, 2012)

DISCLOSURE

Technical Problem

Accordingly, the present invention has been made keeping in mind the above problems occurring in the related art, and the purpose of the present invention is to provide a sealed plasma melting furnace for treating low- and intermediate-level radioactive waste, which is able to batch-process each waste according to the characteristics thereof in a sealed state regardless of the types of the low- and intermediate-level radioactive waste, thereby allowing the secondary pollutants to be minimized.

Technical Solution

In order to accomplish the above object, the present invention provides a sealed plasma melting furnace for treating low- and intermediate-level radioactive waste, the sealed plasma melting furnace including: a waste supply chamber communicatively provided with a hopper at one side thereof and vertically stacking the waste input from the hopper; a pyrolysis chamber channel provided at one side of the waste supply chamber and communicatively coupled with the waste supply chamber; a pyrolysis chamber provided at one side of the pyrolysis chamber channel and having a burner mounted thereon; a melting chamber channel provided at one side of the pyrolysis chamber, guiding the waste transferred from the pyrolysis chamber communicatively provided therewith to fall down, and having a liquid waste injection nozzle on one side thereof; a melting chamber provided at one side of the melting chamber channel, having a plasma torch mounted thereon, and formed and provided with a furnace interior portion accommodating a molten substance on a bottom surface thereof; a processed molten substance discharge channel provided at a lower portion of the melting chamber and discharging the processed molten substance generated in the melting chamber; a secondary combustion chamber channel provided at one side of the pyrolysis chamber and inducing and exhausting an off-gas flow generated in the melting chamber; and a secondary combustion chamber provided at one side of the secondary combustion chamber channel and inducing complete combustion of the off-gas input from the secondary combustion chamber channel communicatively provided therewith.

Advantageous Effects

The sealed plasma melting furnace for treating low- and intermediate-level radioactive waste according to the present invention is provided with a pyrolysis chamber, a melting chamber, and a secondary combustion chamber in a single melting furnace to batch-process the waste, thereby having an advantage of minimizing the installation area and reducing the potential of leakage of radioactive material.

In addition, according to the present invention, the radioactive waste can be smoothly moved only by the structural characteristics of the pyrolysis chamber channel, the melting chamber channel, the secondary combustion chamber channel, and the processed molten substance discharge channel without a separate driving device, and failure and efficiency decrease of devices do not occur, thereby facilitating efficiency enhancement of the overall facilities.

In addition, according to the present invention, the heat source of the plasma torch in the melting chamber can be easily transferred to the pyrolysis chamber because of the structural characteristics of the melting chamber channel of the vertical structure, thereby having an advantage of improving the overall thermal efficiency of the furnace.

In addition, according to the present invention, a sliding door opening/closing part is installed to the slag discharge channel, thereby having an advantage of maintaining safety by preventing exposure or scattering of the radioactive waste to the outside.

In addition, according to the present invention, the feeder head portion seal fills a gap that may occur between the feeder inlet portion and the pyrolysis chamber feeder, thereby having an advantage of preventing the leakage to the outside.

In addition, according to the present invention, the feeder sealing cover is provided with a double shielding function not to allow exposure to the outside through the feeder inlet portion, thereby having an advantage of facilitating improvement of the facility efficiency by improving the shielding performance against the outside.

BEST MODE

Figure 1:
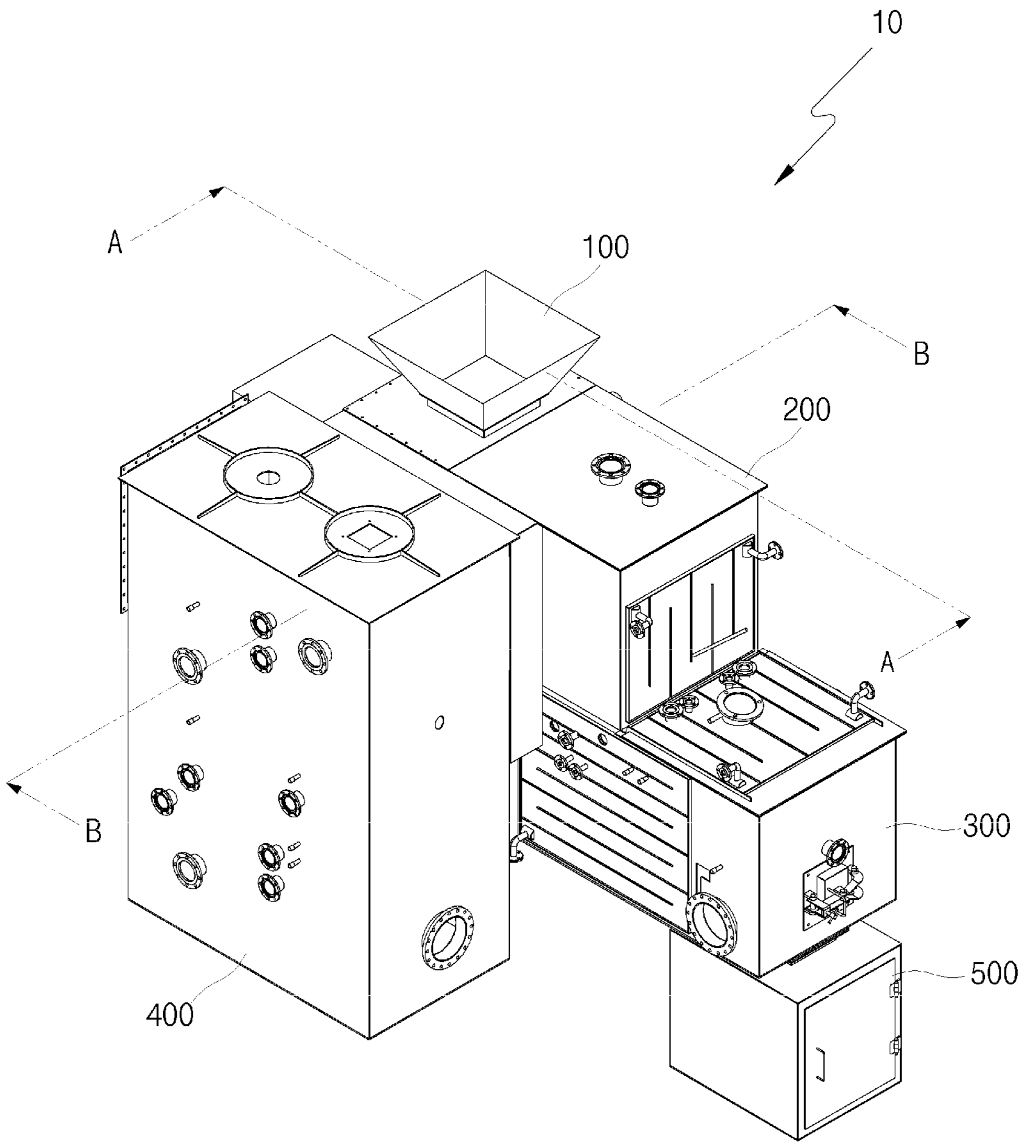
FIG.1 is a perspective view illustrating a sealed plasma melting furnace for treating low- and intermediate-level radioactive waste according to an embodiment of the present invention.

The specific structure or functional description presented in the embodiments of the present invention is merely illustrative for the purpose of describing an embodiment according to the concept of the present invention, and embodiments according to the concept of the present invention may be embodied in various forms. Further, the description should not be construed as being limited to the embodiments set forth herein, but should be understood to include all modifications, equivalents, and alternatives falling within the spirit and scope of the invention.

Hereinafter, the present invention will be described in detail with reference to the accompanying drawings. Like reference numerals in the drawings denote members performing substantially the same function.

Figure 2:
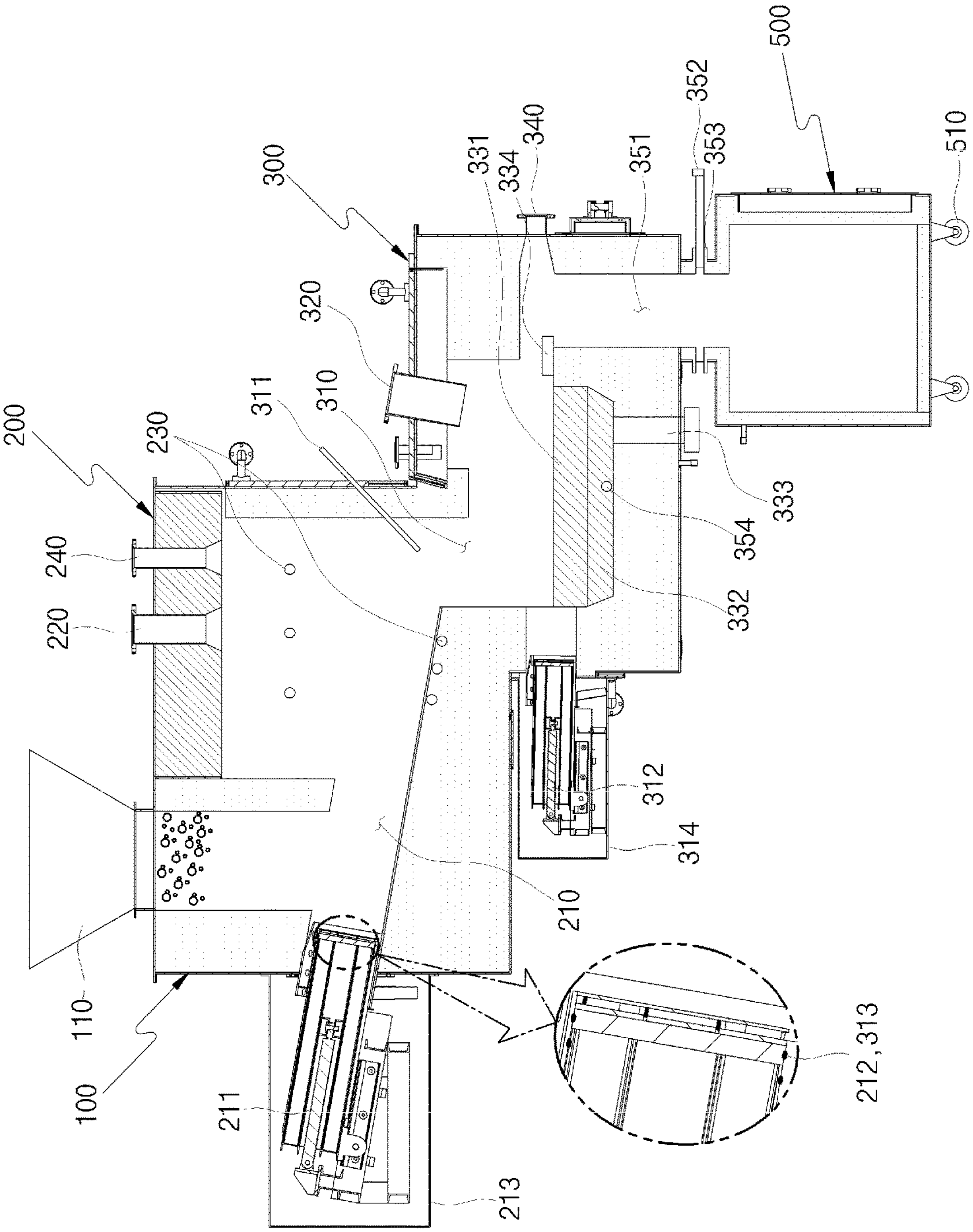
FIG. 2 is a cross-sectional view of FIG. 1 taken along line A-A'.
Figure 3:
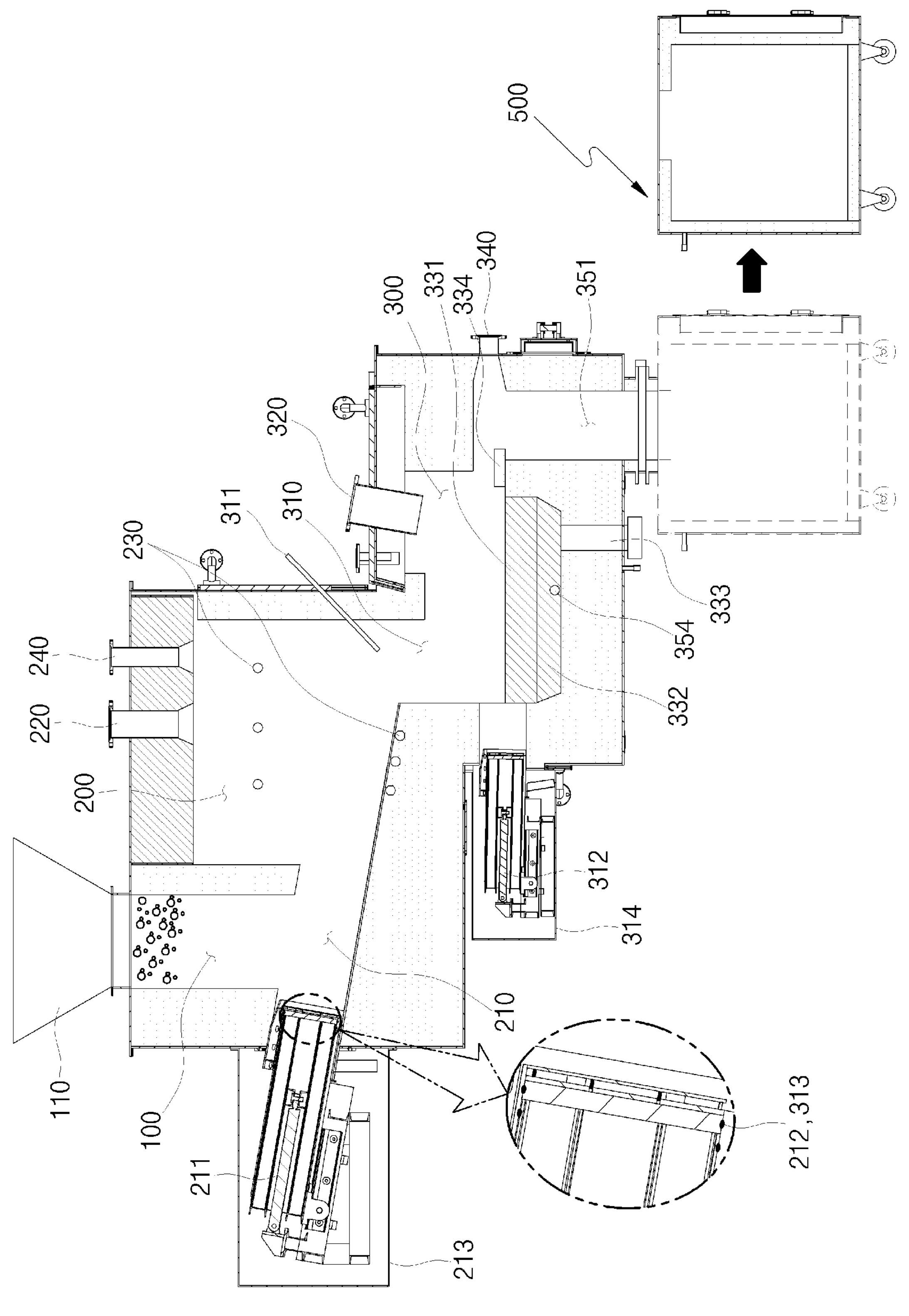
FIG. 3 is a cross-sectional view when a slag container of FIG. 2 is moved.
Figure 4:
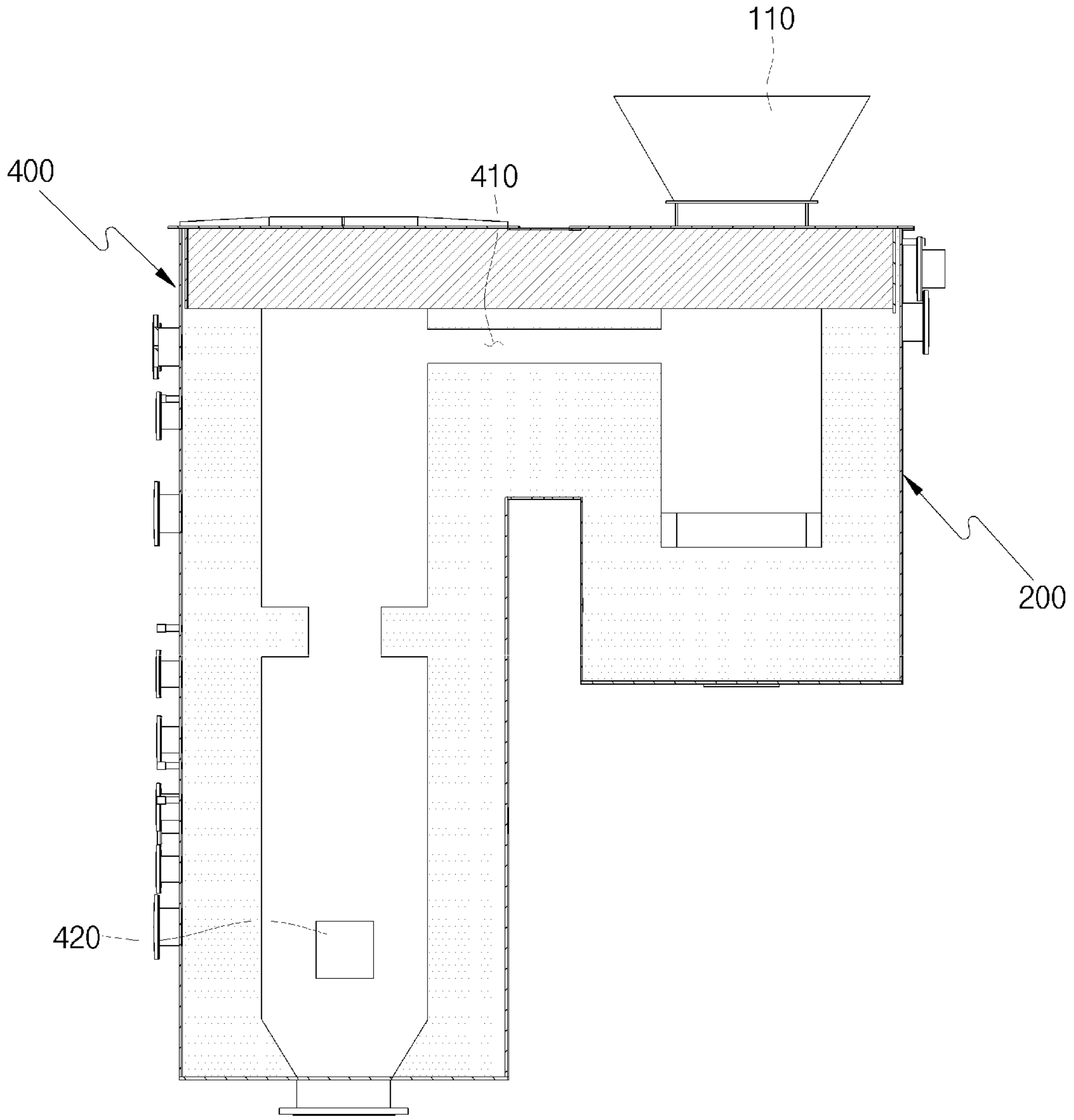
FIG. 4 is a cross-sectional view of FIG. 1 taken along line B-B'.

FIG. 1 is a perspective view illustrating a sealed plasma melting furnace for treating low- and intermediate-level radioactive waste according to an embodiment of the present invention, FIG. 2 is a cross-sectional view of FIG. 1 taken along line A-A', FIG. 3 is a cross-sectional view when a slag container of FIG. 2 is moved, and FIG. 4 is a cross-sectional view of FIG. 1 taken along line B-B'. As illustrated in FIGS. 1 and 2, a sealed plasma melting furnace for treating low- and intermediate-level radioactive waste 10 according to an embodiment of the present invention may be configured to include a waste supply chamber 100, a pyrolysis chamber 200, a melting chamber 300, and a secondary combustion chamber 400. In addition, the sealed plasma melting furnace for treating low- and intermediate-level radioactive waste 10 may be configured to further include a pyrolysis chamber channel 210, a melting chamber channel 310, and a secondary combustion chamber channel 410.

The waste supply chamber 100 is communicatively provided with a hopper 110 at one side thereof, and is able to vertically stack the waste input from the hopper 110. The waste supply chamber 100 may be provided with an inner hollow space having a predetermined depth in the vertical direction, thereby allowing the waste introduced into the hopper 110 to be stored therein. As the waste is stacked in and filled into the inner hollow space of the waste supply chamber 100, the waste supply chamber 100 is sealed even when charged during the melting process according to the continuous operation, whereby the external air may not be allowed to be injected into the pyrolysis chamber 200.

The pyrolysis chamber channel 210 may be provided between the waste supply chamber 100 and the pyrolysis chamber 200, thereby allowing the waste supply chamber 100 and the pyrolysis chamber 200 to be communicatively coupled with each other. In addition, the pyrolysis chamber channel 210 may be provided with a ramp that can guide the moving direction of the waste. Further, the pyrolysis chamber channel 210 may be configured to include a pyrolysis chamber feeder 211.

The pyrolysis chamber feeder 211 may play a role to push the waste toward the pyrolysis chamber 200, the moving direction of the waste. The pyrolysis chamber feeder 211 is seated in an inner hollow space of a feeder inlet portion (not shown) formed at one side of the outer wall and may control the moving speed of the waste to the pyrolysis chamber 200 by rectilinearly reciprocating in the inner hollow space.

The pyrolysis chamber feeder 211 may include a feeder head portion (not shown) inserted into the inner hollow space of the feeder inlet portion (not shown), wherein the feeder head portion (not shown) may further include a feeder head portion seal 212 that is watertightly coupled with the circumferential surface of the feeder head portion by tight fit. In addition, one or more of feeder head portion seal 212 may be provided on the circumferential surface of the feeder head portion (not shown).

The pyrolysis chamber feeder 211 may include a feeder sealing cover 213 for shielding the feeder inlet portion (not shown), wherein the feeder sealing cover 213 may be coupled and installed by watertightly enclosing a front surface of the feeder inlet portion (not shown) provided on the outer wall.

As described above, the feeder head portion seal 212 according to the present invention fills a gap that may occur between the feeder inlet portion (not shown) and the pyrolysis chamber feeder 211, thereby having an advantage of preventing gas or waste in the furnace from being discharged to the outside.

Further, according to the present invention, the feeder sealing cover 213 is provided with a double shielding function so that part of the waste is not exposed to the outside through a gap of the feeder inlet (not shown), thereby having an advantage of facilitating enhancement of the facility efficiency by improving the shielding performance against the outside.

The pyrolysis chamber 200 is provided at one side of the pyrolysis chamber channel 210 and is able to dry and pyrolyze the radioactive waste that has been moved through the ramp of the pyrolysis chamber channel 210 from the waste supply chamber 100. Meanwhile, the pyrolysis chamber 200 may be configured to include a burner 220, air inlets 230, and an observation window 240.

The burner 220 may be supplementarily operated to preheat the interior of the pyrolysis chamber 200 when a heat source generated only by a plasma torch 320 is insufficient.

More specifically, in a case where the process is not smooth during the initial process in which the operation of the pyrolysis chamber 200 is started or during the operation by the operation of the plasma torch 320, the burner 220 may be used in preparation for the case, thereby allowing the interior of the pyrolysis chamber 200 to be controlled for appropriate processing conditions to dry or pyrolyze the radioactive waste.

The air inlets 230 may be formed in a predetermined arrangement in order to inject air into the pyrolysis chamber 200 to control the combustion conditions of the pyrolysis chamber 200. More specifically, the air inlets 230 may be provided in the predetermined arrangement formed in the outer wall of the pyrolysis chamber 200 or in the ramp of the pyrolysis chamber channel 210 in order to increase the combustion efficiency by injecting air for combustion necessary for operation of the pyrolysis chamber 200.

One or more observation windows 240 may be provided on one side, preferably on a ceiling of the pyrolysis chamber 200 for checking the charging state of the radioactive waste into the pyrolysis chamber 200 by observing the inside of the pyrolysis chamber 200. Accordingly, the observation window 240 allows the inside of the pyrolysis chamber 200 to be observed, thereby having an advantage of enabling necessary measures to be appropriately taken according to internal conditions.

The melting chamber channel 310 may be provided between the pyrolysis chamber 200 and the melting chamber 300. In addition, the melting chamber channel 310 may be arranged in a vertical structure in which the pyrolysis chamber 200 and the melting chamber 300 are communicatively coupled with each other so as to guide the waste transferred from the pyrolysis chamber 200 to fall down.

The melting chamber channel 310 may be configured to include a liquid waste injection nozzle 311 and a melting chamber feeder 312.

The liquid waste injection nozzle 311 may be provided on one side of the outer wall of the melting chamber channel 310, preferably at a position close to the melting chamber 300. Thanks to the provided liquid waste injection nozzle 311, the liquid waste can be treated selectively using high energy from the plasma torch 320.

The melting chamber feeder 312 may play a role to push the waste toward the melting chamber 300, the moving direction of the waste in the melting chamber channel 310. Meanwhile, the melting chamber feeder 312 may also include a feeder head portion seal 313 and a feeder sealing cover 314 for complete sealing from the outside, which are the same as the case of the pyrolysis chamber feeder 211, thus claiming thereof is omitted here.

Thanks to a structural feature of the melting chamber channel 310, the heat source generated by the plasma torch 320 of the melting chamber 300 is easily transferred to the pyrolysis chamber 200 and thus may dry or pyrolyze the radioactive waste inside the pyrolysis chamber 200.

As described above, thanks to a structural feature of the melting chamber channel 310 according to an embodiment of the present invention, the heat source of the plasma torch 320 in the melting chamber 300 is allowed to be easily transferred to the pyrolysis chamber 200, thereby having an advantage of enhancing thermal efficiency.

The melting chamber 300 is provided at one side of the melting chamber channel 310 and is able to melt the radioactive waste moved through the melting chamber channel 310 from the pyrolysis chamber 200. Meanwhile, the melting chamber 300 may be configured to include the plasma torch 320 and a furnace interior portion 330 where a molten substance is accommodated on the lower surface thereof. In addition, the melting chamber 300 may be configured to further include an observation window 340 and a processed molten substance discharge channel 350.

The plasma torch 320 is provided on one side of the melting chamber 300 to generate plasma heat at an extremely high temperature and is able to safely treat a large amount of waste regardless of the physicochemical properties of the radioactive waste. The plasma torch 320 can maximize the melting efficiency by utilizing the Joule heat generated by the bottom electrode 333 provided on the bottom surface of the melting chamber 300, the torch flame temperature, and the arc heat.

The furnace interior portion 330 may be formed and provided with a slag layer 331 and a metal layer 332 therein. In addition, the furnace interior portion 330 can accommodate the metal layer and the slag layer when the residues mixed with the metal and the inorganic matter passing through the pyrolysis chamber 200 are melted and separated into the metal and the slag.

The slag layer 331 is formed on a top of the metal layer 332. Meanwhile, the slag layer 331 can accommodate slag having a specific gravity less than that of the metal using difference of the specific gravities.

The metal layer 332 may be formed in a step to be lower than the slag layer 331, thereby allowing the separated metal to be remained to the bottom surface of the furnace interior portion 330 after being melted. In addition, the metal layer 332 may be provided with a bottom electrode 333 on the bottom surface of the metal layer 332.

One or more observation window3 340 may be provided on one side of the melting chamber 300, preferably on the side wall thereof, for checking the charging state of the radioactive waste into the melting chamber 300 by observing the inside of the melting chamber 300. Accordingly, the observation window 340 allows the inside of the melting chamber 300 to be observed for checking of whether the slag is continuously discharged, whereby, when the slag is not smoothly discharged, the melting conditions may be controlled and the continuous processing may be accomplished.

The processed molten substance discharge channel 350, provided at a lower portion of the melting chamber 300, may discharge the processed molten substance generated in the melting chamber 300. The processed molten substance discharge channel 350 may be configured to include a slag discharge channel 351 and a metal discharge port 354.

The slag discharge channel 351, installed at one side of the furnace interior portion 330 and provided with an overflow step 334, may be provided at a location facing the furnace interior portion 330, with the overflow step 334 provided therebetween.

The slag discharge channel 351 may be provided with a slag container 500 on one side thereof. In addition, the slag discharge channel 351 may be formed with an airtightness holding coupling groove 353 at a portion connected to the slag container 500. Further, the slag discharge channel 351 may be configured to include a sliding door opening/closing part 352.

As illustrated in FIG. 3, the slag container 500 is provided at the lower end of the slag discharge channel 351 and may be provided to the storage space after filling the slag discharged through the slag discharge channel 351 from the slag layer 331 thereinto. Meanwhile, the slag container 500 may be configured to include a rail part 510 at a lower portion thereof so as to be movable. Here, the rail part 510 may be provided to move the slag container 500 being separated, when the slag container 500 has a proper amount of slag collected therein, after blocking the furnace interior portion from the outside by closing the opening of the slag discharge channel 351 with the sliding door opening/closing part 352.

When a proper amount of the slag discharged through the slag discharge channel 351 is collected in the slag container 500, the sliding door opening/closing part 352 may be coupled with the bottom opening of the slag discharge channel 351 by sliding to block the opening of the slag discharge channel 351 connected to the slag container 500 from the outside. More specifically, the sliding door opening/closing part 352 may be slid in a horizontal direction so as to be watertightly coupled with the airtightness holding coupling groove 353.

The airtightness holding coupling groove 353 may have a first surface and a second surface so as to be tightly coupled, facing each other, with the sliding door opening/closing part 352. The first surface and the second surface of the airtightness holding coupling groove 353 may face the bottom opening of the slag discharge channel 351 and the slag container 500, respectively. The stepped portion of the first surface and the second surface of the airtightness holding coupling groove 353 corresponds to the thickness of the cross section of the sliding door opening/closing part 352, and may be engaged by tight fit so that no clearance occurs when engaged.

The metal discharge port 354 may be formed on the sidewall at a predetermined height upwards from the bottom surface of the metal layer 332 to discharge the molten metal. Meanwhile, the metal discharge port 354 formed in a hole shape may allow the molten metal to be discharged, by drilling the sidewall of the melting chamber 300, when the molten metal is collected on the metal layer 332 at a certain level or higher. Accordingly, a metal layer 332 where the molten metal can be stored may be provided at the lower end portion of the metal discharge port 354.

The molten metal discharged from the metal discharge port 354 may be trapped in a metal container (not shown) communicatively provided at the rear end of the metal discharge port 354.

As illustrated in FIG. 4, the secondary combustion chamber channel 410 may be provided between the pyrolysis chamber 200 and the secondary combustion chamber 400 to guide and exhaust the off-gas flow generated in the melting chamber 300. That is, the secondary combustion chamber channel 410 may be provided on one side of the pyrolysis chamber 200 and may be communicatively coupled with the secondary combustion chamber 400.

More specifically, the secondary combustion chamber channel 410 may be provided to allow the off-gas generated in the melting chamber 300 to be moved to the secondary combustion chamber 400 passing through the melting chamber channel 310 and the pyrolysis chamber 200.

The secondary combustion chamber 400, provided on one side of the secondary combustion chamber channel 410, may induce complete combustion of the off-gas introduced from the secondary combustion chamber channel 410 communicatively provided therewith. In addition, the secondary combustion chamber 400, provided at a position at a level with the side of the pyrolysis chamber 200 and the melting chamber 300, may allow noxious gas generated when the waste metal resources in the melting chamber 300 is melted to be heated at a high temperature, thereby attaining complete combustion of the noxious gas. Further, the secondary combustion chamber 400, provided with a gas discharge port 420 at a lower portion thereof, may transfer the completely burned off-gas to a gas purifier (not shown). In this case, the gas purifier (not shown) may completely remove dust and other harmful ingredients from the completely burned off-gas and then discharge the purified off-gas to the atmosphere.

The treating method of the radioactive waste using the sealed plasma melting furnace for treating low- and intermediate-level radioactive waste 10 according to the present invention, configured as described above, is as follows. The ready waste is put into the hopper 110 and moves to the pyrolysis chamber 200 through the pyrolysis chamber channel 210. More specifically, as the pyrolysis chamber feeder 211 pushes and inserts the waste into the pyrolysis chamber 200, the waste moves to the pyrolysis chamber 200 along the ramp of the pyrolysis chamber channel 210. Then, the waste may be dried or pyrolyzed.

The pyrolyzed radioactive waste moves to the communicatively provided melting chamber 300 through the melting chamber channel 310. At this time as well, as the melting chamber feeder 312 pushes and inserts the waste into the melting chamber 300, the waste moves into the melting chamber 300, moving vertically downward along the melting chamber channel 310. Then, the waste may be processed for melting.

Because the charging and feeding of the radioactive waste are repeatedly performed even after the commencement of the operation, continuous operation is possible. Meanwhile, the pyrolysis chamber feeder 211 and the melting chamber feeder 312 are provided with the feeder head portion seals 212 and 313, respectively, and with the feeder sealing covers 213 and 314 in the separate feeder inlet portions (not shown), respectively. Accordingly, the gap is blocked doubly and the waste or gas in the furnace may be prevented from leaking to the outside.

When the waste is continuously processed to be melted in the melting chamber 300, the waste is accumulated in the furnace interior portion 330 and may be captured by being separated into the metal layer and the slag layer by the load thereof. In this case, the metal layer 332 where the metal is deposited and the slag layer 331 where the slag is accumulated on the metal layer 332 may be separated by a specific gravity difference thereof.

At this time, when a large amount of metal waste to be treated is generated, an additive such as coke may be added, or the inside of the melting chamber 300 may be guided to a reducing atmosphere to recover as much metal as possible.

The slag collected in the slag layer 331 may be collected into the slag container 500 through the slag discharge channel 351 while being collected over a certain level and overflowing to the overflow step 334.

The metal collected in the metal layer 332 is collected under the lower portion of the slag layer and, when accumulated to a certain level or higher, may be trapped in an outer metal container (not shown) through the metal discharge port 354.

The off-gas generated by the melting of waste in the separate melting chamber 300 passes through the secondary chamber channel 410 together with the off-gas generated in the pyrolysis chamber 200 after moving the melting chamber channel 310 and the pyrolysis chamber 200 and may be collected into the secondary combustion chamber 400.

In this case, the off-gas collected in the secondary combustion chamber 400 may be completely burned and then discharged to the atmosphere while the dust and other harmful ingredients are removed passing through the gas discharge port 420 and the gas purifier (not shown).

The present invention described above is not limited to the above-described embodiments and the accompanying drawings. In addition, it will be apparent to those skilled in the art that various replacement, modifications, and variations may be made in the present invention without departing from the spirit or scope of the general inventive concept as defined by the appended claims. It will be apparent to those of ordinary skill in the arts.

DESCRIPTION OF THE REFERENCE NUMERALS IN THE DRAWINGS

10: A sealed plasma melting furnace for treating low- and intermediate-level radioactive waste

100: Waste supply chamber 110: Hopper

200: Pyrolysis chamber 210: Pyrolysis chamber channel

211: Pyrolysis chamber feeder 212: Feeder head portion seal

213: Feeder sealing cover 220: Burner

230: Air inlet 240: Observation window

300: Melting chamber 310: Melting chamber channel

311: Liquid waste injection nozzle 312: Melting chamber feeder

313: Feeder head portion seal 314: Feeder sealing cover

320: Plasma torch

330: Furnace interior portion 331: Slag layer

332: Metal layer 333: Bottom electrode

334 Overflow step 340: Observation window

350: Processed molten substance discharge channel 351: Slag discharge channel

352: Sliding door opening/closing part 353: Airtightness holding coupling groove

354: Metal discharge port

400: Secondary combustion chamber 410: Secondary combustion chamber channel

420: Gas discharge port

500: Slag container 510: Rail part

The invention claimed is:

1. A sealed plasma melting furnace for treating low- and intermediate-level radioactive waste, the sealed plasma melting furnace comprising:

- a waste supply chamber communicatively provided with a hopper at one side thereof and vertically stacking the waste input from the hopper;
- a pyrolysis chamber channel provided at one side of the waste supply chamber and communicatively coupled with the waste supply chamber;
- a pyrolysis chamber provided at one side of the pyrolysis chamber channel and having a burner mounted thereon;
- a melting chamber channel provided at one side of the pyrolysis chamber, guiding the waste transferred from the pyrolysis chamber communicatively provided therewith to fall down, and having a liquid waste injection nozzle on one side thereof;
- a melting chamber provided at one side of the melting chamber channel, having a plasma torch mounted thereon, and formed and provided with a furnace interior portion accommodating a molten substance on a bottom surface thereof;
- a processed molten substance discharge channel provided at a lower portion of the melting chamber and discharging the processed molten substance generated in the melting chamber;
- a secondary combustion chamber channel provided at one side of the pyrolysis chamber and inducing and exhausting an off-gas flow generated in the melting chamber; and
- a secondary combustion chamber provided at one side of the secondary combustion chamber channel and inducing complete combustion of the off-gas input from the secondary combustion chamber channel communicatively provided therewith.

2. The sealed plasma melting furnace of claim 1, further comprising:

- a pyrolysis chamber feeder pushing the waste toward the pyrolysis chamber, a moving direction of the waste, along a ramp of the pyrolysis chamber channel,
- wherein the pyrolysis chamber feeder is disposed in an inner hollow space of a feeder inlet portion formed on one side of the outer wall and controls a moving speed of the waste by reciprocating motion thereof.

3. The sealed plasma melting furnace of claim 1, further comprising:

- a melting chamber feeder pushing the waste toward the melting chamber, a moving direction of the waste, along the melting chamber channel, wherein
- the melting chamber feeder is disposed in an inner hollow space of a feeder inlet portion formed on one side of the outer wall and controls a moving speed of the waste by reciprocating motion thereof.

4. The sealed plasma melting furnace of claim 2 or 3, further comprising a feeder head portion seal provided by tight fit at a circumferential surface of the feeder head portion.

5. The sealed plasma melting furnace of claim 2 or 3, further comprising a feeder sealing cover coupled and installed by watertightly enclosing a front surface of the feeder inlet portion provided on one side of the outer wall to shield the feeder inlet portion.

6. The sealed plasma melting furnace of claim 1, wherein the pyrolysis chamber further includes air inlets formed in a predetermined arrangement to allow air to be input to an inside of the pyrolysis chamber to induce heatup by the burner.

7. The sealed plasma melting furnace of claim 1, wherein, inside the furnace interior portion, a slag layer where slag is accommodated is formed and provided; a metal layer is formed and provided in a step to be lower than the slag layer, thereby allowing metal by a molten substance to be left therein; and a bottom electrode is provided on the bottom surface of the metal layer.

8. The sealed plasma melting furnace of claim 1, further comprising observation windows provided at one side of the pyrolysis chamber and one side of the melting chamber, respectively, for checking the charging state of the waste, thereby allowing the interior portion to be observed.

9. The sealed plasma melting furnace of claim 1, wherein the processed molten substance discharge channel further includes:

a slag discharge channel formed and provided at a location facing the furnace interior portion, with an overflow step provided therebetween, thereby allowing the slag generated in the melting chamber and overflowed in the overflow step to be discharged therethrough; and a metal discharge port formed and provided on the sidewall at a predetermined height upwards from the bottom surface of the metal layer, thereby allowing the molten metal substance to be discharged therethrough.

10. The sealed plasma melting furnace of claim 9, further comprising a slag container provided at a lower end of the slag discharge channel, thereby allowing the slag discharged from the slag discharge channel to be inserted thereinto.

11. The sealed plasma melting furnace of claim 10, further comprising a sliding door opening/closing part coupled with an opening of the slag discharge channel by sliding.

12. The sealed plasma melting furnace of claim 11, wherein the slag discharge channel is formed with an airtightness holding coupling groove having a first surface and a second surface to be tightly coupled, facing each other, with the sliding door opening/closing part, wherein the first surface and the second surface are disposed to face the opening and the slag container, respectively.

13. The sealed plasma melting furnace of claim 10, wherein the slag container further includes a rail part at a lower portion thereof so as to be movable.

14. The sealed plasma melting furnace of claim 3, further comprising a feeder head portion seal provided by tight fit at a circumferential surface of the feeder head portion.

15. The sealed plasma melting furnace of claim 3, further comprising a feeder sealing cover coupled and installed by watertightly enclosing a front surface of the feeder inlet portion provided on one side of the outer wall to shield the feeder inlet portion.

* * * * *